Figure 1:
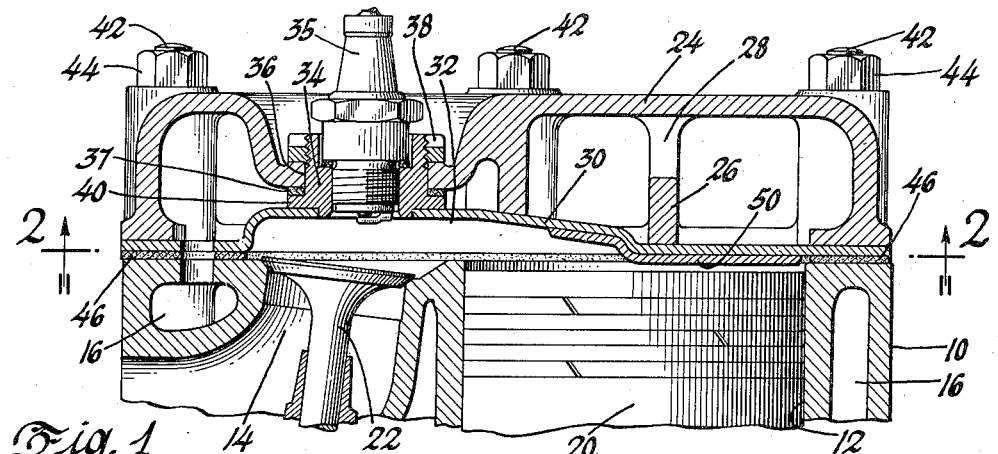

April 12, 1938. H. RABEZZANA 2,113,629
COMBUSTION CHAMBER FOR INTERNAL COMBUSTION ENGINES
Filed Nov. 5, 1934 2 Sheets-Sheet 1

Inventor
Hector Rabezzana
By Blackmore, Spencer & Flint
Attorneys

April 12, 1938.   H. RABEZZANA   2,113,629
COMBUSTION CHAMBER FOR INTERNAL COMBUSTION ENGINES
Filed Nov. 5, 1934   2 Sheets-Sheet 2

Inventor
Hector Rabezzana
By Blackmore, Semmes & Flint
Attorneys

Patented Apr. 12, 1938

2,113,629

UNITED STATES PATENT OFFICE 2,113,629

COMBUSTION CHAMBER FOR INTERNAL COMBUSTION ENGINES

Hector Rabezzana, Flint, Mich., assignor to General Motors Corporation, Detroit, Mich., a corporation of Delaware Application November 5, 1934, Serial No. 751,458

6 Claims. (Cl. 123—173)

This invention relates to combustion chambers of internal combustion engines adapted to permit the use of high compression ratios without "detonation" or "knocking".

The heat exchange between the wall of the combustion chamber of an internal combustion engine and the gases confined thereby, owing to the periodic rise and fall of gas temperature during engine operation, may be resolved into two component flows, one of which is herein designated the steady component and the other the periodic component. One portion of the heat during a given instant penetrates the wall from within the chamber and eventually reaches the cooling medium on the other side of the wall; this is the steady component. The remaining portion is absorbed by the wall during one part of the engine cycle and is returned to the gases within the chamber during another part; this is the periodic component.

The wall of an engine combustion chamber must be cooled in order to keep the temperature within the chamber low enough to avoid "preignition" of the incoming gaseous fuel charge. The heat lost by cooling is not converted into mechanical work and therefore lowers the thermal efficiency of the engine. Hence the cooling loss from the standpoint of thermal efficiency should be kept as low as possible.

After ignition and during the progress of combustion the unburned gas in front of the flame rises rapidly in temperature and may reach a temperature at which it instantaneously inflames, thus producing so-called "detonation" or "gas knocking", particularly under high compression. Therefore from the standpoint of preventing detonation or knocking, that portion of the unburned gas (after the charge has been ignited at the ignition point or points) which constitutes the last portion of the charge to be burned should be kept as cool as possible.

A compromise can be effected by keeping the quantity of heat transference in the steady component as low as possible and by adjusting the periodic component so that the flow shall be maximum during the last part of the reaction within the chamber. It is an object of this invention to effect this compromise, thereby making it possible to increase compression ratios without producing detonation.

The invention consists in a cylinder head having therein a combustion chamber the wall of which is a composite structure of materials arranged and adapted to relatively decrease the total heat flow into the chamber wall from the first and main portion of the burning gases, and to relatively increase the heat flow to the chamber wall from the last portion of the unburned gas during the last portion of the reaction and facilitate return of a substantial portion of the heat, absorbed during said last portion of the reaction, to the succeeding incoming charge. The main portion of the chamber wall in the cylinder head may therefore be composed of ferrous metal such as steel, relatively thin and separating the chamber from cooling fluid, to which there is bonded a layer of copper or other suitable material, of higher conductivity, preferably disposed on or constituting in part the wall in contact with the last portion of the gas to burn. The layer of copper is adapted to absorb heat from the last portion of the charge to burn more rapidly than the ferrous portions in contact with the burning charge, and to restore a large part of the heat absorbed therein to the succeeding incoming charge. Too great dissipation or rejection of heat is prevented by the ferrous wall back of the copper, the copper having no contact with the cooling fluid.

Figure 2:
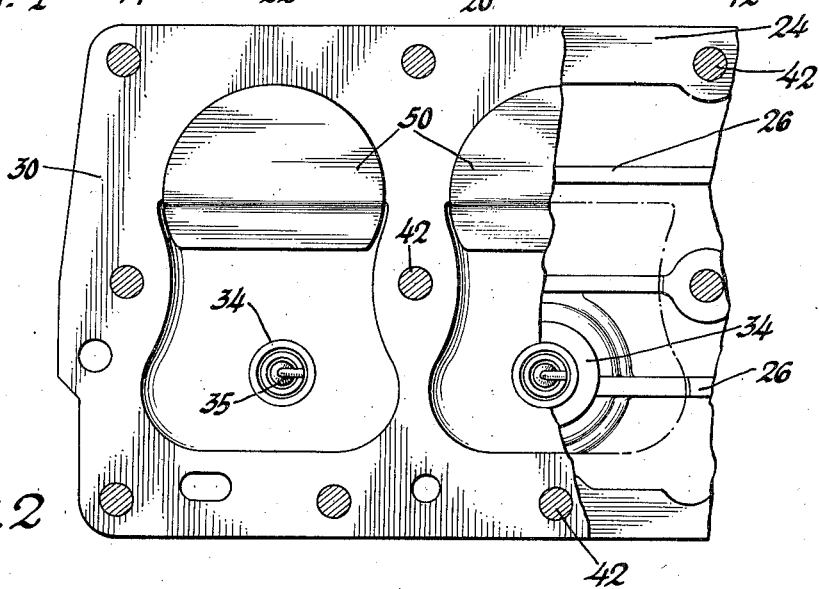
Figure 3:
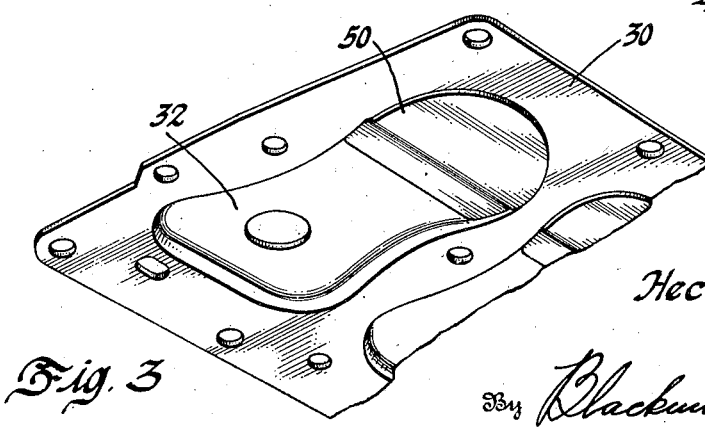
Figure 4:
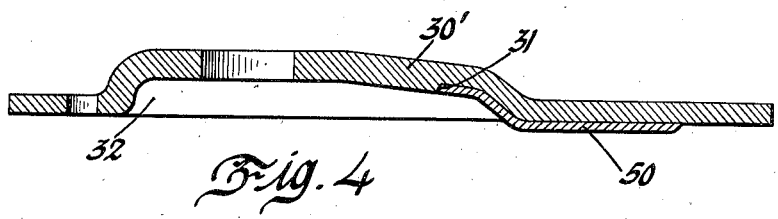
Figure 5:
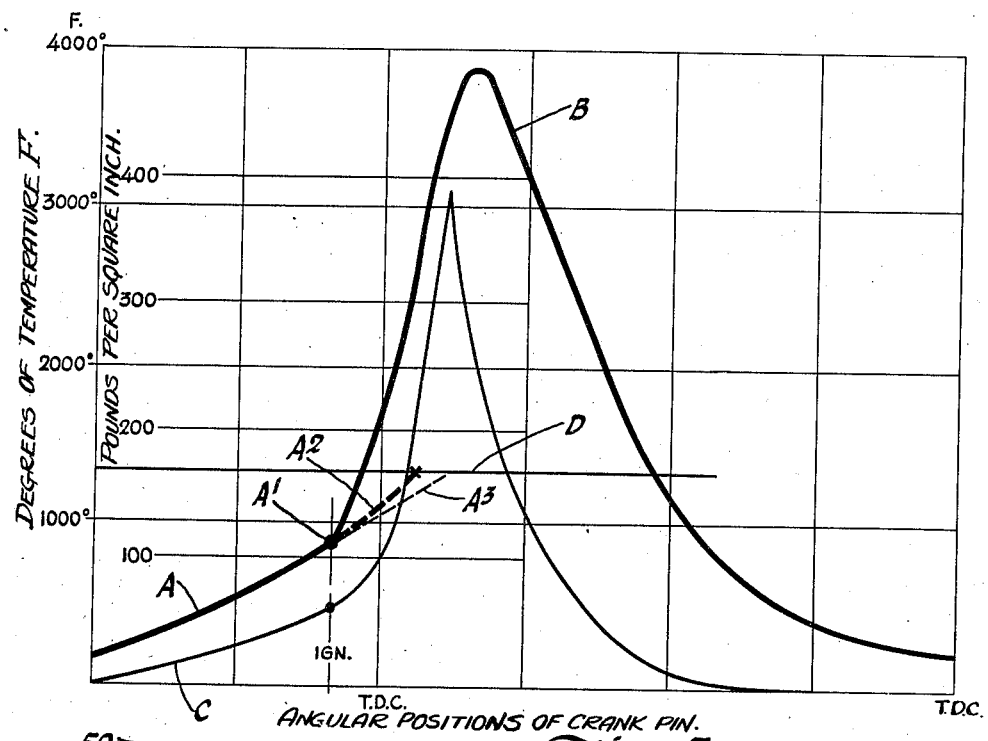
Figure 6:
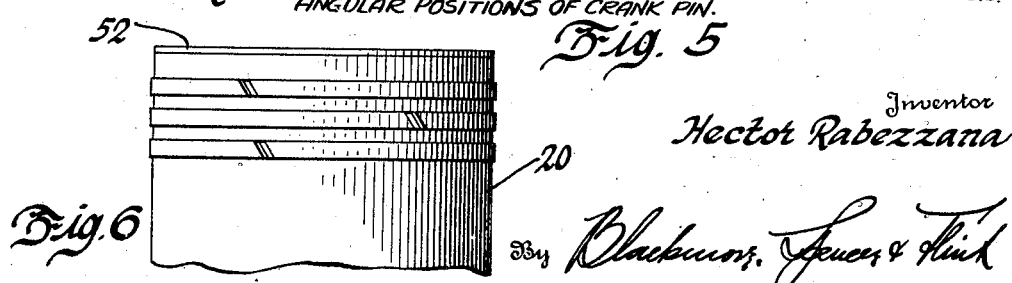

In the accompanying drawings which illustrate one embodiment of the invention, Fig. 1 is a fragmentary view of an internal combustion engine showing a cylinder block and cylinder head in section taken parallel to the cylinder axis; Fig. 2 is an underside view of a fragment of a cylinder head of a multi-cylinder engine; Fig. 3 is a fragmentary perspective view of a wrought metal roof member in which the combustion space or spaces of the cylinder head is formed; Fig. 4 is a section through a modified construction of a combustion chamber roof; Fig. 5 is a graph showing by curves the effect of a composite wall constructed according to this invention upon the temperature of the last portion of gas to burn, and Fig. 6 shows a modified piston.

In the drawings numeral 10 indicates a cylinder block having one or more cylinder bores 12, fuel mixture inlet and exhaust passages, of which one is shown at 14, controlled by a valve 22, and the usual internal passages 16 for circulation of cooling liquid. Piston 20 reciprocates in the cylinder bore 12 and is shown in Fig. 1 at or nearly at the end of its compression stroke, the valves being closed.

The invention is illustrated as embodied in a cylinder head composed of a strong outer main part 24 and an inner part 30 disposed between the outer part and the cylinder block. Outer part 24 may be made of any suitable material, preferably cast iron, provided with suitably separated struts or ribs 26 and passages 28 for allowing the circulation of cooling liquid. One or more combustion chamber cavities 32 are formed, as by die drawing in a draw press a sheet of wrought metal, preferably ferrous metal such as steel, and by preference subsequently to the press operation, intimately bonding to it a mass of material of higher heat conductivity to be hereinafter particularly described. Said inner part 30, which is wrought with one or several combustion chamber cavities 32, depending upon the number of cylinders in a block, is backed and reinforced against gas pressure by said ribs or struts 26; and also, in the construction illustrated, by the flanged seating fixture 34, for spark plug 35. This fixture may be welded to the sheet metal inner part 30, passed through a hole 36 in the outer part 24, suitably packed, as by a washer 37 disposed between flange 40 and the metal surrounding hole 36 in part 24, and clamped by a nut 38 threaded on the fixture at the outer side of said part 24. The back of said sheet metal inner part 30 in the construction shown is in direct contact with circulating cooling water except where the ribs or struts 26 and the fixture 34 bear against it. Sheet metal inner part 30 may be welded or otherwise secured to outer part 24, or may be held in place, as is shown in the drawings, solely by bolts or by studs 42 and nuts 44, which clamp the entire composite head to block 10 with the sheet metal part 30 interposed between the inner surfaces of said outer part 24 and the end surface of block 10. A gasket 46 may, if required, be interposed between the end of block 10 and said inner part 30 of the cylinder head; thus the part 30 when clamped to block 10 encloses between it and said block the combustion chamber space or spaces.

The combustion chamber illustrated registers in part with the cylinder bore and is offset in part to one side of the bore as in so-called L-head engines. The roof part of the wall of the chamber is relatively high over the offset portion and a portion of the cylinder bore, providing a major portion of the chamber cavity which is relatively deep and of relatively large ratio of volume to surface. Valve ports formed in the cylinder block communicate with the relatively deep offset portion of the chamber, and ignition means is disposed within this portion of the chamber adjacent to said ports. The roof portion of said chamber wall is relatively low over that part of the combustion space which is most distant from the ignition means. It approaches close to the face of the piston when the latter is at the end of a compression or scavenging stroke providing a shallow minor portion of the combustion space of relatively low ratio of volume to surface within that part of the chamber which is most distant from the ignition means. This shallow portion of the chamber is so disposed with respect to the ignition means as to receive the last portion of the fuel charge to be burned during a combustion period.

A characteristic element of the combustion chamber of this invention consists of a combustion-space-inclosing wall of relatively low heat conductivity having a layer of material of relatively high heat conductivity bonded thereto, but in contact only with the last portion of the charge to burn during a combustion cycle and of greater capacity to absorb and give up heat than that portion of the wall which encloses and the surface of which is exposed to the remainder of the combustion space.

As shown in the drawings, a layer 50 of high heat conducting metal, preferably copper, is welded or otherwise intimately bonded to the ferrous metal part 30 in order to provide an uninterrupted metallic heat conducting path between the layer 50 and the part 30. Layer 50 is of substantial thickness and heat absorbing capacity. It overlies a portion of the piston which approaches it closely at the end of the compression and scavenging strokes and is in contact with the last portion of a fuel charge to burn.

As indicated in Fig. 6 a layer of copper 52 may be bonded to the pressure surface of the piston 20 if desired.

The thickness of the inner part 30 of the cylinder head, constituting the main part of the wall of the combustion chamber is selected to effect that degree of cooling required to prevent preignition and not unnecessarily decrease volumetric efficiency, and otherwise secure within the chamber the proper heat balance.

Fig. 4 illustrates a slight modification of the inner part of a cylinder head embodying this invention. In this modification the part 30' may be a casting or a forging shouldered or rabbeted as at 31 and so reduced in thickness by an amount equal to the thickness of the copper layer 50 bonded to it, thus providing a smooth chamber roof where the surface of the iron or steel part 40' merges with that of the copper layer 50.

Fig. 5 graphically indicates, during a part of one cycle of a four stroke cycle engine, the effect of a composite combustion chamber wall (as disclosed herein) upon the temperature of the last portion of the fuel gas to burn, as compared with the effect of the usual cast iron wall of combustion chambers of similar form. The data from which this graph is constructed were obtained by careful tests under severe operating conditions.

In this graph (Fig. 5) angular positions of a crank pin of an internal combustion engine crankshaft are indicated along the axis of abscissae; degrees of temperature Fahrenheit are indicated in a column of numerals along the axis of ordinates at the extreme left, and pounds pressure per square inch in a column of numerals along the axis of ordinates adjacent and to the right of the column of numerals indicating temperature. The letters TDC on this graph indicate "top dead center" by which is meant the position of the crank pin and piston when a straight line between the axis of the crank shaft and the axis of the wrist pin to which the distant end of the connecting rod is pivoted passes through the crank pin axis. A crank pin axis passes through the top dead center position twice during one cycle of a four-stroke cycle internal combustion engine; namely, at the end of the compression stroke and at the end of the scavenging stroke. The letters IGN indicate the point at which ignition takes place with reference to top dead center during a compression stroke.

In Fig. 5, curve A indicates rise of temperature of incoming unburned gaseous mixture in a combustion chamber having a wall constructed according to this invention. Curve A shows a gradual rise in temperature of the incoming mixture until ignition occurs, indicated at point A', approximately 32° before top dead center is reached by the crank pin on the compression stroke. At time of ignition the temperature of the incoming mixture is indicated to be about 980° F. Curve B represents the temperature of the burning and burned mixture after ignition. The temperature then rapidly rises, reaches its peak of about 3900° F. before the piston has completed half of its power stroke and then falls sharply as shown.

Curve C indicates the pressure rise in pounds per square inch within the illustrated combustion space the wall of which is constructed in accordance with this invention. The pressure rise is gradual until the axis of the crank pin reaches the point at which ignition occurs, indicated as about 32° before the crank pin has reached top dead center during the compression stroke. Pressure then rises sharply and culminates at about 370 pounds per square inch, as indicated, when the crank pin has moved about 40° past top dead center on the power stroke, just prior in the cycle to peak temperature of the burning gas. Pressure then sharply falls through the remainder of the power stroke.

At D is a horizontal line indicating the critical temperature of the unburned fuel gas, that is, the temperature at which it spontaneously ignites, indicated to be a little above 1400° F.

Broken line $A^2$ indicates the temperature rise of the unburned gas in contact with the usual cast iron wall of a combustion chamber after the ignition spark has occurred.

Dotted line $A^3$ indicates the temperature rise of the unburned gas in contact with the composite wall of a combustion chamber constructed according to this invention of the same contour as the one with a cast iron wall. It does not reach line D at peak pressure.

As during combustion the temperature rise of the last portion of unburned gas to be burned in a combustion chamber having a composite wall made according to this invention, does not reach critical temperature at peak pressure, as shown by the chart, Fig. 5, it is clear that with combustion chambers constructed according to this invention, higher compression ratios can be made use of without occurrence of detonation, than can be utilized in iron walled chambers of the same form with the same fuel.

In operation, an ignition spark is produced as usual, igniting the gaseous mixture then being compressed by the piston. Combustion starts and spreads in all directions from the point of initial combustion, the flame front presenting in general a spherical advancing surface. The last unburned portion of a progressively burning charge is therefore that which is located farthest from the point of primary ignition. In the chamber illustrated, the last portion of unburned gas to be reached by the advancing flame front is that over the piston in contact with the high heat absorbing mass of copper, or the like. The copper withdraws heat from the portion of gas in contact with it; and when the temperature within the chamber has dropped below the temperature of said copper, heat therefrom is returned to the gases in the chamber to compensate in some degree for the losses of heat conducted through the chamber walls and dissipated in the cooling medium. The wall of steel or iron 30, back of copper mass 50, retards the transfer of heat from the copper to the cooling medium so that a large part of the heat is stored in the copper until the temperature of the gases drops to a point where the heat flow in the wall reverses and restores to the gas a useful portion of the heat temporarily withdrawn for the purpose of preventing detonation. The flexibility of the relatively thin metal roof of the combustion chamber of this invention, its utility in controlling cooling, and its elasticity are factors supplementing the heat balancing qualities of the composite wall, which permit higher compression ratios, than the usual cast iron walled chamber, before detonation occurs.

I claim:

1. In an internal combustion engine of cylinder and reciprocating piston type, a cylinder head provided with a combustion space communicating with a cylinder bore, the wall of said combustion space within said cylinder head being composed of relatively low heat conducting material having a layer of higher heat conducting material bonded to a portion only thereof so as to provide an uninterrupted heat conducting path between them, means for introducing fuel into and discharging products of combustion from said combustion space, ignition means at one side of said space, said layer of relatively high heat conducting material being bonded to the low heat conducting material to form that portion of the wall which overlies that portion of the combustion space which is most remote from the ignition means whereby the surface of the low heat conducting material is exposed in the combustion space in the vicinity of the ignition means, and the surface of the high heat conducting material is exposed in that portion of the combustion space most remote from the ignition means.

2. A combination as defined in claim 1 in which the relatively low heat conducting material consists of ferrous metal and the relatively high heat conducting material is composed of copper metallically bonded to the ferrous metal throughout the area of contact between them.

3. A combination as defined in claim 1 in which the means for introducing fuel into and discharging products of combustion from said combustion space comprises valve ports communicating with that side of the combustion space in which the ignition means is disposed.

4. A combination as defined in claim 1 in which the combustion space consists of a relatively deep major portion containing the ignition means and a relatively shallow minor portion remote from the ignition means, the overlying wall of the shallow minor portion having said layer of relatively high heat conducting material bonded to its inner side.

5. In an internal combustion engine, a cylinder head comprising a water-cooled cast iron outer part, a wrought sheet ferrous metal inner part having a combustion-chamber cavity therein, ignition means within the cavity at one side thereof, a layer of copper of substantial thickness intimately bonded to the inner side of the wrought sheet ferrous metal so as to provide an uninterrupted heat conducting path between the copper and the ferrous metal, said layer of copper overlying that portion only of the chamber cavity which is most remote from the ignition means.

6. In an engine having a cylinder block provided with a cylinder bore, a combustion chamber having a portion extending over and an adjacent portion extending laterally from said bore and having a composite wall including metals of different thermal conductivities, the section of said wall directly above said cylinder bore only comprising the metal of higher thermal conductivity.

H. RABEZZANA.